US011401911B2

(12) United States Patent
Kovacs et al.

(10) Patent No.: US 11,401,911 B2
(45) Date of Patent: Aug. 2, 2022

(54) ENERGY-GENERATING APPARATUS FOR UTILIZING THE ENERGY OF A FLOWING MEDIUM

(71) Applicants: Attila Kovacs, Hódmezővásárhely (HU); Tibor Kovacs, Hódmezővásárhely (HU)

(72) Inventors: Attila Kovacs, Hódmezővásárhely (HU); Tibor Kovacs, Hódmezővásárhely (HU)

( * ) Notice: Subject to any disclaimer, the term of this patent is extended or adjusted under 35 U.S.C. 154(b) by 0 days.

(21) Appl. No.: 16/954,130

(22) PCT Filed: Dec. 13, 2018

(86) PCT No.: PCT/IB2018/060008
§ 371 (c)(1),
(2) Date: Jun. 15, 2020

(87) PCT Pub. No.: WO2019/116298
PCT Pub. Date: Jun. 20, 2019

(65) Prior Publication Data
US 2021/0167699 A1    Jun. 3, 2021

(30) Foreign Application Priority Data
Dec. 15, 2017  (HU) ................................ HU1700525

(51) Int. Cl.
F03B 17/06     (2006.01)
F03D 5/06      (2006.01)
(Continued)

(52) U.S. Cl.
CPC .............. F03B 17/06 (2013.01); F03B 17/00 (2013.01); F03D 5/04 (2013.01); F03D 5/06 (2013.01);
(Continued)

(58) Field of Classification Search
CPC .. F03B 17/06; F03B 17/00; F03D 5/04; F03D 5/06; H02N 2/185; F05B 2240/31; F05B 2220/706
(Continued)

(56) References Cited

U.S. PATENT DOCUMENTS 3,995,972 A * 12/1976 Nassar ...................... F03D 5/06
416/68
6,153,944 A * 11/2000 Clark ........................ F03G 7/08
290/54
(Continued)

FOREIGN PATENT DOCUMENTS

CN       203301396 U    11/2013
CN       203627085 U     6/2014
(Continued)

*Primary Examiner* — Pedro J Cuevas
(74) *Attorney, Agent, or Firm* — Thomas Horstemeyer, LLP

(57) ABSTRACT

The subject of the invention is an energy generating apparatus for utilizing the energy of a flow medium having a support structure (13), at least one waving element (1), at least two fastening elements (4), a drive and control unit (5), and an energy recovery and transfer unit (10), wherein the waving element (1) is connected to the fastening elements (4), the drive and control unit (5) is connected to the fastening elements (4). It is characterized in that it comprises at least one turbulizer element (2), the waving element (1) between two fastening elements (4) is described as a regular waveform, determined by a function, and comprises at most one full wave period. The subject of the invention also includes the method for application of the apparatus.

20 Claims, 4 Drawing Sheets

(51) Int. Cl.
  *H02N 2/18*   (2006.01)
  *F03B 17/00*  (2006.01)
  *F03D 5/04*   (2006.01)

(52) U.S. Cl.
  CPC ........ *H02N 2/185* (2013.01); *F05B 2220/706* (2013.01); *F05B 2240/31* (2013.01)

(58) Field of Classification Search
  USPC .......................................... 416/20 R; 290/54
  See application file for complete search history.

(56) References Cited

U.S. PATENT DOCUMENTS

| | | | |
|---|---|---|---|
| 6,424,079 B1 | 7/2002 | Carroll | |
| 7,224,077 B2* | 5/2007 | Allen | F03D 5/00 290/1 R |
| 7,493,759 B2* | 2/2009 | Bernitsas | F03G 7/08 60/497 |
| 7,626,281 B2* | 12/2009 | Kawai | H02K 7/1892 290/54 |
| 8,102,072 B2* | 1/2012 | Tsou | F03D 5/06 290/55 |
| 8,142,154 B2* | 3/2012 | Gartner | F03B 5/00 416/81 |
| 8,272,839 B2* | 9/2012 | Gartner | F03B 17/00 416/81 |
| 8,657,575 B2* | 2/2014 | Morris | F03B 17/06 416/79 |
| 8,928,167 B2* | 1/2015 | Kane | F03B 17/062 290/54 |
| 9,006,919 B2* | 4/2015 | Lynch | F03B 17/06 416/223 R |
| 9,222,465 B2* | 12/2015 | Thorp | F03D 5/00 |
| 9,371,661 B2* | 6/2016 | Grace | F03D 9/00 |
| 9,447,774 B2* | 9/2016 | Olsen | F03D 5/06 |
| 9,683,538 B2 | 6/2017 | Drevet | |
| 9,732,724 B1* | 8/2017 | Burke | F03B 13/264 |
| 9,879,647 B2* | 1/2018 | Drevet | F03D 13/20 |
| 10,641,243 B2* | 5/2020 | Yañez Villarreal | H02K 7/09 |
| 10,756,596 B2* | 8/2020 | Ulrich-Verderber | F03D 5/06 |
| 11,053,914 B2* | 7/2021 | Yáñez Villareal | F03D 5/06 |
| 2006/0064972 A1* | 3/2006 | Allen | F03D 5/06 60/369 |
| 2007/0297903 A1* | 12/2007 | Morris | F03B 17/06 416/132 A |
| 2008/0048455 A1* | 2/2008 | Carney | F03D 5/06 290/54 |
| 2008/0295509 A1* | 12/2008 | Bernitsas | F03G 7/08 60/497 |
| 2009/0058091 A1* | 3/2009 | Douglas | F03B 17/062 290/53 |
| 2009/0302612 A1 | 12/2009 | Gartner | |
| 2012/0230021 A1* | 9/2012 | Lynch | F03D 5/00 362/183 |
| 2014/0023481 A1* | 1/2014 | Drevet | F03B 5/00 415/90 |
| 2014/0077496 A1* | 3/2014 | Gill Londono | F03B 13/142 290/53 |
| 2014/0097621 A1 | 4/2014 | Kassianoff | |
| 2015/0198139 A1* | 7/2015 | Lynch | F03B 15/16 415/10 |
| 2016/0208767 A1* | 7/2016 | Drevet | F03D 13/20 |
| 2017/0284365 A1* | 10/2017 | Yañez Villarreal | H02K 35/02 |
| 2019/0101100 A1* | 4/2019 | Yáñez Villareal | F03G 7/00 |
| 2019/0115803 A1* | 4/2019 | Ulrich-Verderber | F03D 5/06 |

FOREIGN PATENT DOCUMENTS

| | | |
|---|---|---|
| FR | 3022957 A1 | 1/2016 |
| HU | 230616 B1 | 4/2017 |
| JP | 2005354765 A | 12/2005 |
| KR | 101425302 B1 | 7/2014 |
| RU | 2522126 C1 | 7/2014 |

\* cited by examiner

ENERGY-GENERATING APPARATUS FOR UTILIZING THE ENERGY OF A FLOWING MEDIUM

CROSS REFERENCE TO THE RELATED APPLICATIONS

This application is the national stage entry of International Application No. PCT/IB2018/060008, filed on Dec. 13, 2018, which is based upon and claims priority to Hungarian Patent Application No. P1700525 filed on Dec. 15, 2017, the entire contents of which are incorporated herein by reference.

TECHNICAL FIELD

The subject of the invention is an energy-generating apparatus for utilizing the energy of a flowing medium having a support structure, at least one waving element, and at least two fastening elements, the waving element being connected to the fastening elements. The present invention also includes the method for the application of the apparatus.

BACKGROUND

In the state of the art, in addition to the various rotary blade wind turbines, the following solutions are known to utilize wind energy, or in general, to utilize the energy of flowing media.

For example, the specification of Korean Patent No. KR101425302 B1 describes a nano-structured flag which moves in the air due to the effect of the wind, and, as a result of the movement, energy can be extracted from the piezoelectric material in the body of the flag. The description does not include instructions on the use of the inventive device in water, and regulated movement of the flag is not implemented.

Similarly, the Chinese Utility Model No. CN203627085 U includes piezoelectric crystals in its description. Here the piezoelectric crystals are placed between the flag and the flagpole, so when the flag is being moved by the wind, voltage is produced in the piezoelectric crystals. This description again does not include any instructions on utilizing the energy of a flowing liquid such as water.

The Japanese Disclosure Document No. JP2005354765 A describes a solution for the utilization of wind energy where a piezoelectric crystal is embedded in the platform of a flag. As a result of the wind, the flagpole itself is put in motion, so the crystals placed in the platform can produce energy by the alternating pressure, but this solution can only produce a small amount of energy in relation to its size and space requirements.

The Chinese Utility Model No. CN203301396 U presents a description of a solution where the movement of the flag causes friction to produce electricity in a variable or low wind. This solution is also basically intended solely for the utilization of wind energy, without a description for the application of it in a fluid.

The solution described in the Russian Patent Document No. RU2522126 C1 uses ropes stretched between poles to utilize wind energy. The flags placed in the centre of the ropes move the ropes under the wind; the invention utilizes energy from the swinging motion of the ropes. The solution described in the document again solely provides for the utilization of wind energy and is a system with relatively low efficiency.

The U.S. Pat. No. 9,447,774 B2 describes a portable, wind-powered innovative device. The central element of the invention is a suspended rigid body (such as a cylinder, a rod, or a plate) which is capable of inducing vibration or which can be made to vibrate by the flowing medium (wind). With the suspended body performing the vibratory movement, the energy of the flowing medium can be extracted, for example by electromagnetic induction. Yet again, this solution works only for the utilization of wind energy.

The U.S. Pat. No. 7,626,281 B2 describes an energy converter apparatus comprising a flexible plate. By placing the flexible plate into a flowing medium (water, air), the energy from the medium can be converted through the movement of the plate. In this solution, the flexible plate is free to swing around; its movement is not characterized by periodicity. Therefore, the generation of power is also uneven, and this solution can again be used solely for wind energy utilization.

The U.S. Pat. No. 7,493,759 B2 also introduces an energy converter apparatus. In this case, one or more cylindrical elements of a support structure are immersed in the fluid. The elements immersed in the fluid are driven by the flowing motion and turbulence of the fluid, so that the kinetic energy of the medium can be converted into energy to be utilized. This solution can only be used in flowing liquids, as a lower density medium (for example, air) does not exert sufficient force, i.e., is not effective enough.

The U.S. Pat. No. 9,683,538 B2 discloses an innovation regarding an energy-generating apparatus for utilizing the energy of a flow medium. The device does not operate in terms of a regular wave motion and does not include a turbulizer element or a drive and control unit. The passage of irregular waves is driven by the thrust of the flowing medium exerting an effect on the wave peaks. A further disadvantage of this invention is that the wave does not have a support that would be able to control the wave motion of the material towards the direction of the particular wave period. It only uses fluid as a flowing medium.

The U.S. Pat. No. 6,424,079 B1 also describes an energy-generating apparatus for utilizing the energy of a flowing medium. The invention is not capable of producing controlled and regular wave motion, but is merely the Kármán vortex street that drives the motion, similar to the flapping of flags in the wind. The current is produced by the piezoelectric ribbons built into the flag material, and only a fluid may be used as medium. Since mechanical energy cannot otherwise be extracted from non-regular wave motion, this device offers very low energy efficiency. The wave period is not defined, the flexible material does not have a pre-tension that would force it into a waveform shape, and the wave has no point where any support would be able to control and drive the wave material in the direction of the given wave period. The invention does not have a drive and control unit.

The Hungarian Patent Document No. HU230616 B describes a drive apparatus. The invention has no turbulizer element since the invention is primarily designed as a flow-generating device. The formation of shedding vortex streets cannot happen in an energy-generating variant of the device as the material of the wave is tucked between two flat plates. In such a device with a turbulizer element possibly added, the flat plates would dissipate the shedding vortices swirling opposite to each other. The one and a quarter length of a wave period being used here can almost be considered regular, but the end of the wave is not driven towards the direction of the given wave period; only its position is determined by a moving structure as relative to the beginning of the wave. The force for shaping it into an approximate waveform is created by using the side deflectors. The device only uses liquid as a flow medium. The present invention is also different from this apparatus in that the present invention ensures that the two endpoints of our wave material are always guided and/or driven in the direction of the particular wave period, so that the maximum amount of one wave period always moves as a regular wave.

US patent application no. US2014097621 A1 discloses a variable foil machine for power generation and fluid propulsion, the machine offers several modes of operation. US patent application no. US2009302612 A1 describes a machine operating via oscillation of a flexible sheet that captures the energy in a fluid flow, and converts it into mechanical motion. The inventions discussed in these two patent specifications however do not perform regular wave motion, or even wave motion, and it would not be possible either, since there is no unit that could ensure the continuous, regular wave motion. Furthermore, neither of the machines include a turbulizer element, and the foil/flexible sheet of the machine does not contain piezoelectric crystals.

SUMMARY

The purpose of the invention is to eliminate the faults of known solutions and to implement an apparatus and a method for recovering energy from a flowing medium more efficiently, while not damaging the environment and wildlife.

The inventive step is based on the recognition that when the apparatus is realized according to claim 1, a more advantageous invention will be obtained. Based on the recognition that wave motion is one of the most effective modes of displacement in nature, the present invention is able to provide a device generating energy or power efficiently.

According to the above purpose, the most general embodiment of the solution outlined in the present invention can be achieved according to claim 1. The most general form of the method is described in independent claim 7. The various embodiments are described in the dependent claims.

The solution is generally an energy-generating apparatus for utilizing the energy of a flow medium, having a support structure, at least one waving element, and at least two fastening elements, as well as a drive and control unit and an energy recovery and transfer unit, wherein the waving element is connected to the fastening elements, and the drive and control unit is connected to the fastening elements. Characteristics of the invention include that it comprises at least one turbulizer element, and the waving element between two fastening elements can be described by a regular function, comprising at most one full wave period.

Various embodiments may be provided when the shape of the turbulizer element is a cylinder or a column.

Also, different embodiments may be provided when at least one of the fastening elements is constituted of a turbulizer element.

In a further embodiment, the material of the waving element may be made of a flexible material, preferably of plastic or metal or rubber, or may be made of a material consisting of multiple rigid interconnecting parts, preferably of plastic or metal.

Also, various embodiments may be provided by the drive and control unit comprising casters and ropes and/or straps and/or at least one lever and/or at least one working cylinder and/or at least one swivel arm and at least one control lever.

In another further embodiment, the energy recovery and transfer unit includes a crankshaft, wherein the crankshaft is connected to a crank and/or a freewheel drive device.

A still further embodiment may be provided when a piezo generator and/or an induction generator and/or a device with a direct mechanical drive device and/or an energy storage system and/or a direct consumer unit is connected to the energy recovery and transfer unit.

The object of the present invention is also a method for the application of the apparatus. The application's characteristic is that the waving element is put into motion by the use of a flowing medium; the motion of the fastening elements is controlled by the drive and control unit, a regular wave motion of the section of the waving element between the fastening elements is ensured; the wave motion of the waving movement is passed to the energy recovery and transfer unit; then, finally, the energy of the energy recovery and transfer unit is extracted.

The method may also be performed when the flowing medium is water or air.

Finally, the method may be performed to utilize the energy of the energy recovery and transfer unit for the purpose of providing a local residential energy supply and/or an electricity network supply and/or for directly powering electrical equipment and/or devices equipped with a direct mechanical drive, or the method may be performed to utilize the energy by forwarding it to be stored.

BRIEF DESCRIPTION OF THE DRAWINGS

The invention will now be described in greater detail with reference to examples and drawings of embodiments.

The attached drawings are as follows.

DETAILED DESCRIPTION OF THE EMBODIMENTS

Figure 1:
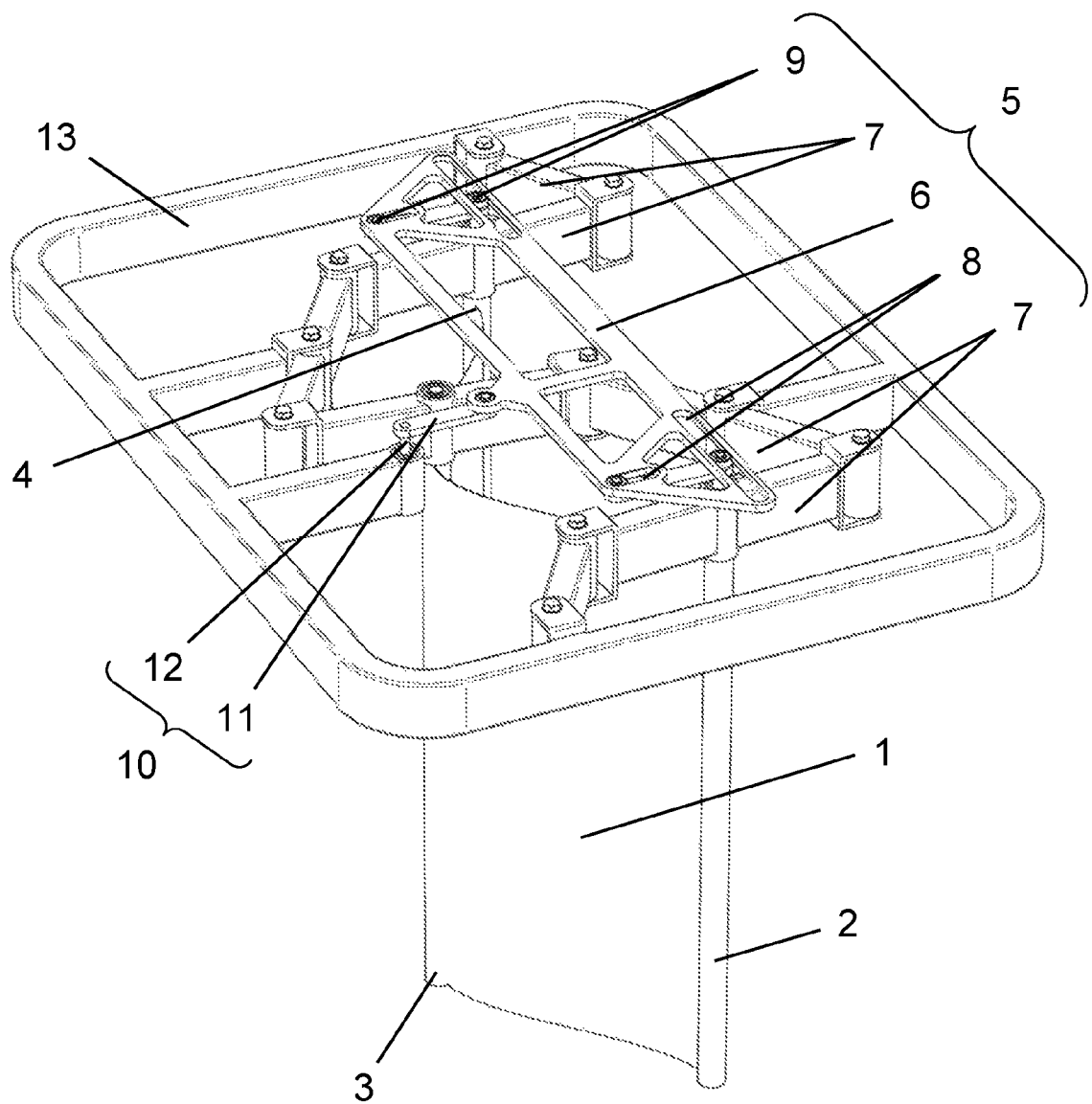
FIG. 1 is a spatial view of an embodiment of the apparatus from the top view.
Figure 2:
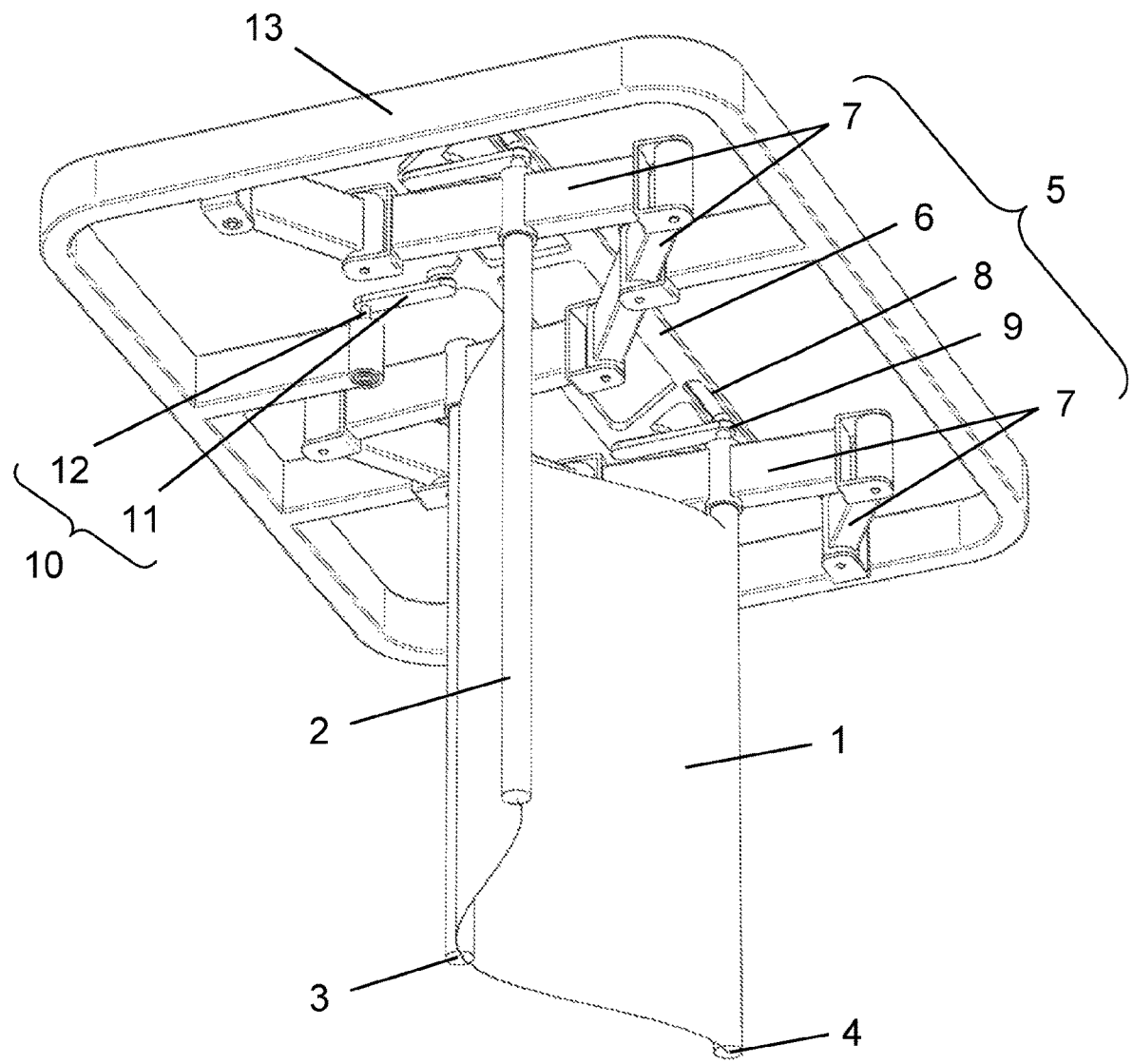
FIG. 2 is a spatial view of an embodiment of the apparatus shown in FIG. 1 from the bottom view.

FIGS. 1 and 2 show an embodiment of the apparatus, which is preferably optimized for the utilization of hydropower. The central element of the apparatus is the waving element 1 which is fixed in at least two positions in the embodiment, specifically in three positions as shown in FIGS. 1-2 as a regular waveform, described for example by a sine function. The material of the waving element 1 may be armor-like, comprising multiple rigid or only slightly flexible interconnected materials, preferably metal or plastic or shapeable material, preferably a flexibly shapeable material such as a metal, plastic, or rubber plate. The material of the waving element 1 may also be provided with piezoelectric crystals. The fastening elements 4 are provided for fixing the waving element 1 in place; a special embodiment may be the fastening element 4 and the fastening element 4 implemented as the turbulizer element 2, as shown in FIGS. 1-2. The turbulizer element 2 is a fastening element 4 which, in addition to fixing the waving element 1, has a spatial design that ensures creation of vortices, i.e., it is not or is only slightly streamlined, such as a cylinder or a column. The spacing of the fastening elements 4 may be at most one full wave period, but intermediate fastening elements 3 may also be provided between the fastening elements 4. In the embodiment shown in FIGS. 1 and 2, one intermediate fastening element 3 is arranged between the fastening elements 4. The number of intermediate elements 3 is typically between 0 and 10, preferably between 1 and 5. The fastening elements 4 may fix the waving element 1 in position at its edges, but the waving element 1 may also extend beyond the fastening elements 4. The part of the waving element 1 extending beyond the fastening elements 4 will not perform a regular waving motion. In the apparatus, multiple waving elements 1 and fastening elements 4 may be provided in a serial fashion or even parallel to each other, in which case the waving element 1 positioned between each fastening element 4 forms at most one full wave period, and in the case of the waving elements 1 positioned serially, the regular period of the waving element 1 does not break at the fastening elements 4, but continues to proceed in a regular fashion. Intermediate fastening elements 3 may be provided between the fastening elements 4. For a given apparatus, the phase difference between the individual fastening elements 4 and the intermediate fastening elements 3 is constant, thus ensuring that the waving element 1 continuously maintains a regular wave motion. By means of the turbulizer element 2, any fastening element 4 in the apparatus may be substituted; preferably the fastening elements 4 at the two extremes function as turbulizer elements 2. Thus, the flowing medium approaching the waving element 1 from any direction, for example due to currents caused by ebb and flow, will always generate vortices that run along the entire length of the waving element 1. Moving each of the fastening elements 4 and the intermediate fastening elements 3 is done according to the respective waveform belonging to the given position via the drive and control unit 5. The drive and control unit 5 ensures the regular wave motion of the waving element 1 between the fastening elements 4 by controlling the displacement of the fastening elements 4 according to the particular wave phase. The drive and control unit 5 may be realized, for example, by means of a system of casters and ropes or straps, by means of a system constructed of rods or arms, or perhaps by working cylinders, or according to the embodiment also illustrated in FIGS. 1 and 2, the drive and control unit 5 may be constructed by the use of at least one control lever 6, at least one swivel arm 7, as well as by the use of cross bearing bush grooves 8 and bearings 9 constructed inside the control lever 6. In the embodiment shown in FIGS. 1 and 2, the fastening elements 4, the fastening element 4 (the turbulizer element 2, and the intermediate fastening element 3), are connected to a series of swivel arms 7 linked to each other by pivots. The swivel arms 7 are provided with bearings 9 that fit into the grooves 8 of the control lever 6, and the bearings 9 are only able to move within the appropriately sized grooves 8. The drive and control unit 5, which is constructed from the swivel arms 7, the control lever 6, and the bearings 9 running in the grooves 8 thereof, ensures that the fastening elements 4 move according to the respective wave phase. In the embodiment shown in FIGS. 1 and 2, where precisely one full wave period exists between the fastening element 4 and the turbulizer element 2, the drive and control unit 5 moves the fastening element 4 and the turbulizer element 2 in the same phase, i.e., in synchrony, thereby ensuring the regular motion of the waving element 1. As shown in FIGS. 1 and 2, the intermediate fastening element 3 is located halfway between the fastening element 4 and the turbulizer element 2, and because of this, the drive and control unit 5 controls the intermediate fastening element 3 by the phase displaced by 7C relative to the turbulizer element 2 and the fastening element 4 so that the regular wave motion of the waving element 1 is ensured. The drive and control unit 5 is connected to the support structure 13, which is realized in the embodiment shown in FIGS. 1 and 2 so that the swivel arms 7 are connected to the support structure 13. To extract the energy of the flowing medium, the energy recovery and transfer unit 10 recovers energy from the motion of the waving element 1 and then transfers it for storage or utilization. The energy recovery and transfer unit 10 may comprise a piezoelectric unit for recovering and transferring the energy produced by the piezoelectric crystals located in the material of the waving element 1 and/or for recovering and transferring the energy produced by the motion of the waving element 1. Extraction of the kinetic energy of the waving element 1 may be accomplished by a variety of mechanical constructions; for example, the energy recovery and transfer unit 10 includes a crank 11 and a crankshaft 12 according to the embodiment shown in FIGS. 1 and 2. The crank 11 continuously rotates the crankshaft 12 via the motion of the drive and control unit 5, the crank 11 being connected to the control lever 6 as shown in FIGS. 1 and 2, while the crankshaft 12 is connected to the support structure 13. In the energy recovery and transfer unit 10, a freewheel drive device may also be connected to the crankshaft 12. For the purpose of energy utilization, the energy recovery and transfer unit 10 may be connected, for example, to an induction generator and/or a direct mechanical drive device and/or an energy storage system and/or a direct consumer unit. To increase energy efficiency, the device may be equipped with diffusers and/or confusers and/or deflectors that may be used to control the flow of the medium and to increase the flow rate.

Figure 3:
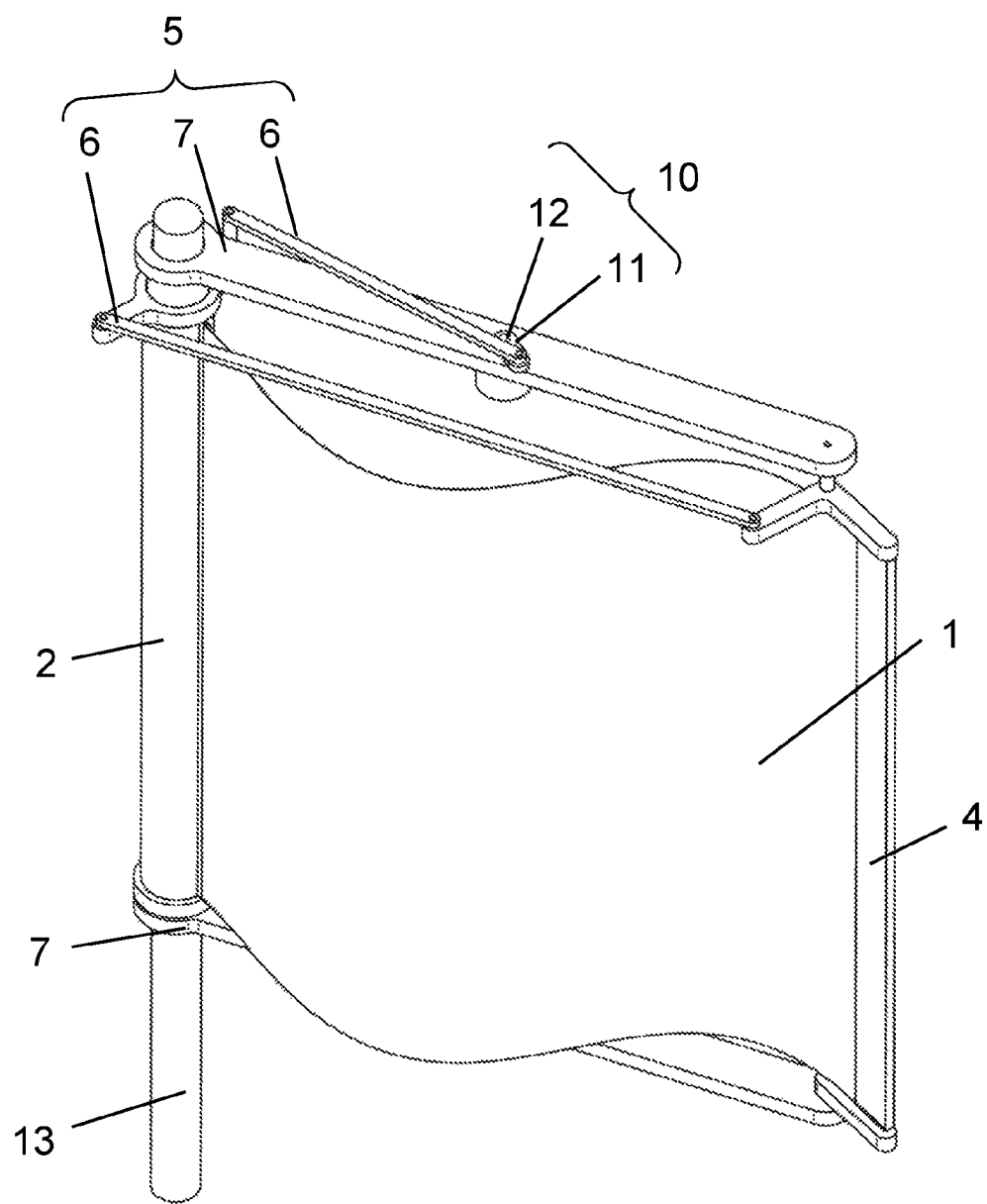
FIGS. 3 and 4 are spatial views of another embodiment of the apparatus from the perspective of two different directions.
Figure 4:
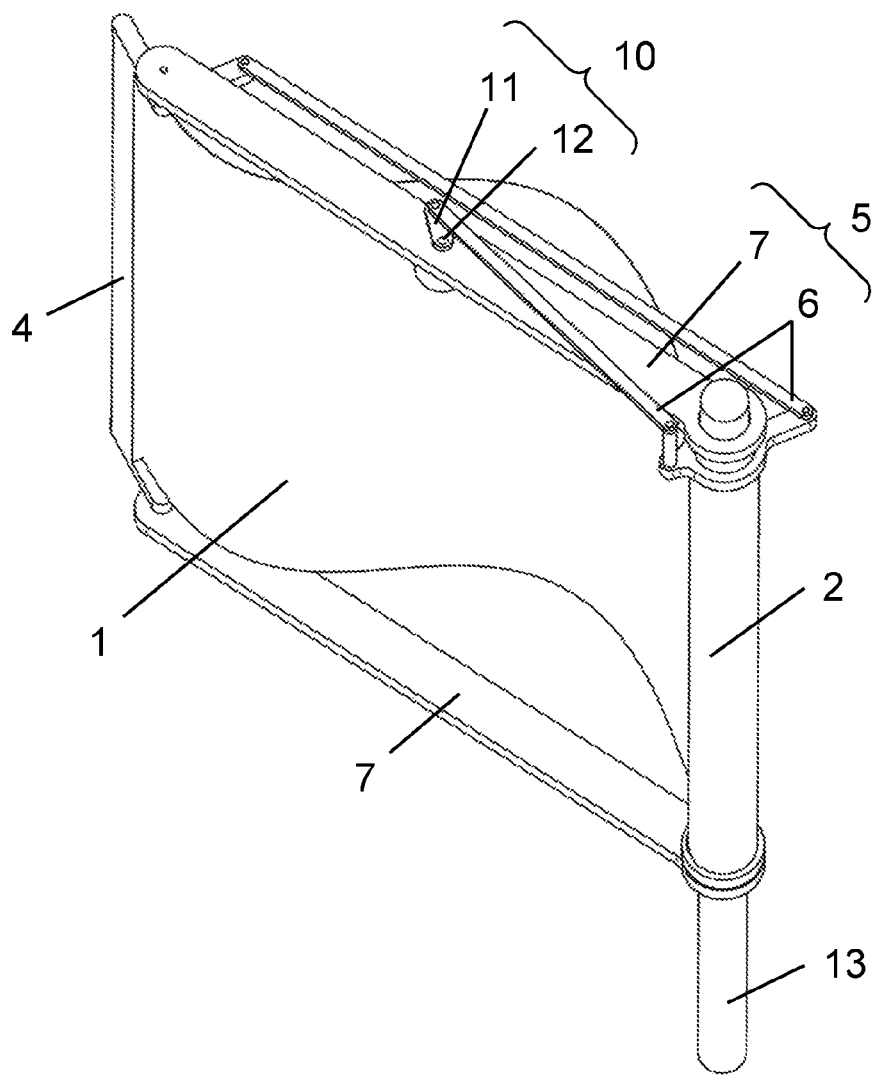

FIGS. 3 and 4 show another possible embodiment of the apparatus, which is preferably optimized for the utilization of wind energy. In this case, the central element of the apparatus, the waving element 1, is fixed in two places with the fastening element 4, which, according to the embodiment shown in FIGS. 3 and 4, comprises a fastening element 4 and a turbulizer element 2. The distance between the fastening elements 4 is a maximum of one full wave period, preferably exactly one full wave period. In the arrangement shown in FIGS. 3 and 4, the distance between the fastening elements 4 is exactly one full wave period, and the fastening element 4 and the turbulizer element 2 fasten the waving element 1 at both ends. It is also possible to provide an embodiment where the waving element 1 extends beyond the fastening elements 4 ensuring fixation in place; in this case, only the part of the waving element 1 between the fastening elements 4 will perform a regular wave motion. An embodiment may also be provided where the waving element 1 placed between the two fastening elements 4 is shorter than one full wave period. In such a case, the fastening elements 4 must be moved toward the fixing points according to the existing constant phase difference. Optionally, the apparatus may be provided with intermediate fastening elements 3, the number of intermediate fastening elements 3 being typically between 0 and 10. The intermediate fastening element 3 must be moved according to the wave phase corresponding to the fixing point, as described in FIGS. 1 and 2. The function of the turbulizer element 2 is the same as described in FIGS. 1 and 2, i.e., its purpose, in addition to fixing the waving element 1 in place, is to break the motion of the flowing medium, thereby causing vortices passing through the entire length of the waving element 1. The turbulizer element 2 therefore is not or is only slightly streamlined, such as a cylinder or a column. In the apparatus, any fastening element 4 may be replaced by a turbulizer element 2; preferably the fastening element 4 connected to the support structure 13 may serve as the turbulizer element 2 as well, because the flowing medium always turns the waving element 1 in the direction of the flow, thereby causing the fluid flow to break. In this embodiment, the fastening elements 4 are again connected to the drive and control unit 5, which ensures the regular wave motion of the waving element 1 and controls the associated fastening elements 4 accordingly. Similar to the descriptions by FIGS. 1 and 2, the drive and control unit 5 may be constructed incorporating various mechanical solutions, for example, the use of a system of casters and ropes or of straps, the use of arms, or perhaps working cylinders. In the embodiments shown in FIGS. 3 and 4, the drive and control unit 5 comprises two swivel arms 7 and control levers 6 in each case. The drive and control unit 5 may also be implemented by the use of other mechanical solutions. The drive and control unit 5 is again connected to the support structure 13 in this embodiment, and the swivel arms 7 are connected to the support structure 13 in the illustrated embodiment.

In the embodiment of FIGS. 3 and 4, the phase difference between the turbulizer element 2 and the fastening element 4 is exactly one full wave period; thus, the turbulizer element 2 and the fastening element 4 must move in the same manner. To this end, the turbulizer element 2 and the fastening element 4 are rigidly connected by the control lever 6 and the swivel arms 7. The swivel arms 7 may rotate relative to the support structure 13 so that the waving element 1 may be able to rotate in the wind to achieve increased efficiency while the drive and control unit 5 ensures the continuous wave motion without interruption. In this case, the energy recovery and transfer unit 10 again provides the extraction of energy; the unit consists of a crank 11 and a crankshaft 12 according to the embodiment illustrated in FIGS. 3 and 4. The crank 11 takes up the movement of the drive and control unit 5 as the crank 11 is in communication with the control lever 6. Then the crank 11 drives the crankshaft 12 to which it is attached. The rotational energy of the crankshaft 12 may be recovered by known methods; an inductive generator and/or a direct mechanical drive device and/or energy storage system and/or a direct consumer unit may be connected to the crankshaft 12, or in the generalized case, to the energy recovery and transfer unit 10.

The waving element 1 may be equipped with piezoelectric crystals in this embodiment as well; in this case, the energy recovery and transfer unit 10 also serves to recover and transfer the energy of piezoelectric crystals. Furthermore, this construction may be provided with structural elements that influence the fluid flow, i.e., diffusers and/or confusers and/or deflectors.

For the application of the invention, the waving element 1 is put into motion via a flowing medium such as water or wind to provide the desired result. The waving element 1 is fixed in place by means of fastening elements 4 and optionally by means of intermediate fastening elements 3; the fastening elements 4 may be specially constructed as turbulizer elements 2. The fastening elements 4 and/or the turbulizer elements 2 fixing the waving element 1 in place break the movement of the flowing medium causing vortices, and the resulting vortices run along the entire length of the waving element 1, thus putting the entire waving element 1 into motion. A drive and control unit 5 connected to the fastening elements 4 and/or to the turbulizer elements 2 ensures that the part of the waving element 1 between the fastening elements 4 will perform a regular wave motion, and for this purpose, the fastening elements 4 are controlled according to the respective wave phase. The energy extracted from the waving element 1 is recovered by the energy recovery and transfer unit 10 and then forwarded for use. The energy of the energy recovery and transfer unit 10 is used for and/or stored for the purpose of providing a local residential energy supply and/or an electricity network supply and/or for directly powering electrical equipment and/or devices equipped with a direct mechanical drive, or the energy is forwarded for storage.

The presented equipment offers many advantages. One of the advantages of the invention is that it even makes it possible to produce cheap, environmentally-friendly energy locally, thereby reducing the costs and losses of energy transport. Various embodiments of the invention are able to utilize the energy from wind or water. A great advantage of the invention is that its production is inexpensive because it consists of few and ordinary parts. Another advantage is that the equipment can be installed easily without requiring special permission. For example, it can be installed for the purpose of wind energy utilization without a separate support structure, and it can be put into operation by making use of the height of existing buildings. Thus, the equipment is an excellent option to supply power directly to households or certain household appliances (pumps, irrigation systems, etc.) or to store or feed the generated energy back to the network by connecting the equipment to energy storage systems. The equipment can be operated on a low-cost basis since the structural components of the equipment are resistant to environmental hazards such as water, frost, UV radiation, or dust, and, thanks to its slow movement, no major operational or maintenance costs arise during the service life of the equipment. Thanks to its low installation and operating costs, the costs are quickly recovered, especially because the equipment is optimized for the low speeds of water or wind that frequently occur. The equipment can also be scaled to typical speeds at a given location. For example, when wind energy is utilized, the equipment can steadily produce a significant amount of current even at wind speeds of 3-4 m/s; this wind speed is maintained 35-40% of the time in the moderately windy country of Hungary, so it is not necessary to build the equipment in any natural wind tunnel. Likewise, in running water, the equipment can be scaled to the actual flow rates and energy demands, thereby generating green energy in an efficient manner. Another advantage of the device is that it can be used as supplementary energy-generating equipment for local solar-powered energy supply systems, so in times when the utilization of solar energy is reduced, for example at night or in cloudy weather, energy can continue to be produced as the wind is most likely blowing under these circumstances. An additional advantage is that the equipment can be fitted in an aesthetic manner for most environments; furthermore, it can serve as an excellent advertising medium due to its almost continuous, thus noticeable, movement. The equipment can be installed on the roof structures or on the sides of residential buildings or industrial facilities or factories. Moreover, so-called energy-generating islands and parks can be created by connecting several units so that the installation is able to serve greater energy requirements. The use of the invention is also advantageous from the environmental point of view, since it has no harmful emissions and, due to its design, it does not present a hazard to wildlife either. If the device is inversely operated, i.e., it generates wave motion from energy supplied to it, it can be operated as an engine in water without putting aquatic life in danger.

The field of application of the invention is energetics and energy generation, in particular power generation locally or by power plants, in urban, rural, or riverside locations, by utilizing the movement of oceans as well as the direct power supply of particular electrical equipment. When operated in the inverse way in water, it can be used as a propulsion engine for watercraft.

In addition to the above examples, the invention may be implemented within the scope of protection in other forms and with other manufacturing procedures.

The invention claimed is:

1. An energy-generating apparatus for utilizing energy of a flow medium, comprising:
   a support structure;
   at least one-waving element;
   at least two fastening elements comprising a first fastening element and at least one turbulizer;
   a drive and control unit;
   and
   an energy recovery and transfer unit,
   wherein the at least one waving element is connected to the at least two fastening elements, and the drive and control unit is connected to the at least two fastening elements,
   wherein the at least one waving element is connected to the at least one turbulizer element,
   wherein the turbulizer element is configured to generate vortices that run along the length of the waving element,
   the at least one waving element between the at least two fastening elements has a shape of a regular waveform of at most one full wave period, and
   the drive and control unit is configured to move the fastening elements and the waving element in the same phase to create regular wave motion of the waving element.

2. The energy-generating apparatus according to claim 1, wherein a shape of the at least one turbulizer element is a cylinder or a column.

3. The energy-generating apparatus according to claim 1, wherein the at least one waving element comprises a material, a flexible material, or a material constructed of a plurality of rigid interconnected parts.

4. The energy-generating apparatus according to claim 3, wherein the material, the flexible material, or the material constructed of the plurality of rigid interconnected parts comprises at least one of a plastic or a metal.

5. The energy-generating apparatus according to claim 1, wherein the drive and control unit comprises at least one of: a plurality of casters and ropes, a plurality of straps, at least one lever, at least one working cylinder, at least one swivel arm, or at least one control lever.

6. The energy-generating apparatus according to claim 1, wherein the energy recovery and transfer unit comprises a crankshaft, and at least one of a crank or a freewheel drive device is connected to the crankshaft.

7. The energy-generating apparatus according to claim 1, wherein the energy recovery and transfer unit is connected to at least one of an induction generator, a direct mechanical drive device, an energy storage system, or a direct consumer unit.

8. A method for the application of the energy-generating apparatus according to claim 1, wherein the at least one waving element is driven into motion by the flow medium, and further wherein the drive and control unit provides control for the motion of the at least two fastening elements, providing the regular wave motion, the motion of the at least one waving element performing the regular wave motion is passed to the energy recovery and transfer unit, then an energy from the energy recovery and transfer unit is recovered, wherein the flowing medium is water or air.

9. The method according to claim 8, wherein the energy from the energy recovery and transfer unit is forwarded to provide energy to at least one of a local residential energy supply, at least one device equipped with a direct mechanical drive, or to a storage for the energy.

10. The energy-generating apparatus according to claim 1, further comprising at least one intermediate fastening element, wherein the drive and control unit is configured to control a displacement of the at least one intermediate fastening element relative to the at least one turbulizer element and the first fastening element.

11. The energy-generating apparatus according to claim 1, wherein the support structure has an inner wall and the drive and control unit is connected to the inner wall of the support structure.

12. The energy-generating apparatus according to claim 1, wherein the drive and control unit comprises a swivel arm that is connected to the support structure.

13. The energy-generating apparatus according to claim 1, wherein the drive and control unit comprises a swivel arm that comprises a bearing and a control lever that comprises a cross bearing bush groove, the bearing of the swivel arm being configured to fit within the cross bearing bush groove of the control lever.

14. The energy-generating apparatus according to claim 1, further comprising at least one intermediate fastening element, wherein the drive and control unit comprises a swivel arm, the swivel arm being connected to at least one of the at least two of the fastening elements or the at least one intermediate fastening element.

15. The energy-generating apparatus according to claim 1, further comprising at least one intermediate fastening element, wherein the drive and control unit comprises a plurality of swivel arms, wherein the at least one intermediate fastening element and at least one of the at least two fastening elements are connected to the plurality of swivel arms.

16. The energy-generating apparatus according to claim 1, further comprising at least one intermediate fastening element, wherein the drive and control unit comprises a swivel arm and a control lever, the swivel arm being connected to the control lever, wherein at least one intermediate fastening element and at least one of the at least two fastening elements are connected to the control lever by the swivel arm.

17. The energy-generating apparatus according to claim 1, wherein the drive and control unit comprises a first swivel arm and a second swivel connected by a pivot.

18. The energy-generating apparatus according to claim 1, wherein the at least one waving element is configured for motion and comprises piezoelectric crystals for producing energy from the motion, and the energy recovery and transfer unit comprises a piezoelectric unit for recovering and transferring the energy to a storage or supply system.

19. The energy-generating apparatus according to claim 1, wherein the drive and control unit comprises a control lever and the energy recovery and transfer unit comprises a crank and a crankshaft, the crank being connected to the control lever and the crankshaft being connected to the support structure.

20. The energy-generating apparatus according to claim 1, further comprising at least one intermediate fastening element, wherein the at least one intermediate fastening element is provided between the at least two fastening elements, and a phase difference between the at least two fastening elements and the at least one intermediate fastening element is configured to be constant to ensure the at least one waving element maintains a regular wave motion.

\* \* \* \* \*